United States Patent
Raviola et al.

(10) Patent No.: US 8,032,243 B2
(45) Date of Patent: Oct. 4, 2011

(54) SYSTEM AND METHOD FOR HANDLING A DEPENDENCY BETWEEN TWO PRODUCT SEGMENTS OF A PROCESS MODELING A PRODUCTION SYSTEM

(75) Inventors: Alessandro Raviola, Genoa (IT); Marco Magagnini, Genoa (IT); Elena Reggio, Genoa (IT); Ornella Tavani, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 391 days.

(21) Appl. No.: 12/214,962

(22) Filed: Jun. 24, 2008

(65) Prior Publication Data
US 2009/0076785 A1    Mar. 19, 2009

(30) Foreign Application Priority Data

Sep. 13, 2007  (EP) .................................... 07017964

(51) Int. Cl.
*G06F 19/00* (2011.01)
(52) U.S. Cl. ............ 700/103; 700/15; 700/97; 700/101; 700/102; 707/601
(58) Field of Classification Search .................. 700/11, 700/14, 15, 95, 97, 99–107, 116, 121, 182; 703/1, 6; 707/600, 601, 899
See application file for complete search history.

(56) References Cited

U.S. PATENT DOCUMENTS

| | | | | |
|---|---|---|---|---|
| 5,467,285 A | * | 11/1995 | Flinn et al. | 700/95 |
| 6,128,588 A | * | 10/2000 | Chacon | 703/6 |
| 6,628,996 B1 | * | 9/2003 | Sezaki et al. | 700/83 |
| 7,835,805 B2 | * | 11/2010 | Hood et al. | 700/20 |
| 2001/0034562 A1 | * | 10/2001 | Aumer et al. | 700/97 |

OTHER PUBLICATIONS

JP 2005 352934 A; Dec. 22, 2005; Fuji Electric Holdings Co Ltd.

* cited by examiner

*Primary Examiner* — Sean Shechtman
(74) *Attorney, Agent, or Firm* — Laurence A. Greenberg; Werner H. Stemer; Ralph E. Locher

(57) ABSTRACT

A system for handling a dependency between two product segments of a process modeling a production system within a manufacturing execution system (MES) includes a network and a production modeler. The network has data processing units running a MES software for controlling and/or monitoring a production process operating a production components. The production modeler within the MES software defines the dependency between the two product segments, and allows modeling the dependency in a graphical environment as a link between the two product segments. The link is selected from a tool box having link types, each defining one of predetermined dependencies, such as: the two product segments run in parallel, one of the product segments starts after end of the other product segment, one of the product segments starts with a predetermined delay after the other product segment has been started, both two product segments use an identical equipment.

2 Claims, 2 Drawing Sheets

SYSTEM AND METHOD FOR HANDLING A DEPENDENCY BETWEEN TWO PRODUCT SEGMENTS OF A PROCESS MODELING A PRODUCTION SYSTEM

BACKGROUND OF THE INVENTION

The present invention relates to a system and a method for handling a dependency between two product segments of a process modeling a production system within a manufacturing execution system.

In the world of process, automation and process monitoring standard automation systems for controlling the widest conceivable variety of machines and plants are state of the art. Such technology covers in particular a broad range of products which are offered by the Siemens Corp. under its SIMATIC® product family within the field of manufacturing execution systems (MES). An extensive line of products for solving the technical tasks in question such as counting, measuring, positioning, motion control, closed-loop control and cam control enhance the performance capabilities of appropriate process controllers. A variety of configurations enable the implementation of flexible machine concepts.

In this context, a broad range of IT solutions exists to connect the actual hardware close to the technical and/or logistical process to the application layer of the client driving the installation. Manufacturing execution systems have therefore been developed to meet the requirements of a service oriented architecture (SOA) to integrate seamlessly into a totally integrated automation (TIA). A plug & play architecture, in which individual functions can be combined and configured with each other thereby forms the basis for this success thereby simplifying the complex structures of controlling a manufacturing plant or the like.

These demands often require in the backbone rather complicated and sophisticated software solutions which enable the approach of totally integrated automation. In view of this, the software engineers very often use production moduler to define the plant model and its standard operating procedures and create the respective new software by means of a high level graphical language which identifies the workflow of activities within the software. Subsequently, this string/term of high level graphical language is translated into a client based software language executable on the machine language level. This translation requires tremendous efforts in programming and need serious testing to check whether the translated program behaves the same as the original string/term of the high level graphical language.

For modeling the production system it is required to divide the productive process in many steps (hereinafter called product segments) so that each of the product segments represents a simple action that can be controlled by the MES system. This subdivision must take care of all dependencies existing between the product segments in order to guarantee that the entire production will be executed in the correct way. The most common dependency managed by MES systems and coded in international standard ANSI/ISA/95 represents the management of the timing relations between product segments. This type of dependency is used to define the temporal sequence of the execution of the single product segments. This dependency is modeled as typed link between the two product segments. The link type defines the type of dependency and an optional value can be used to add additional details or restraints (e.g. product segment A must start no later than 2 minutes after product segment B is started).

In the real environment, another type of dependency exists which represents the demand to use a specific production resource for the execution of a product segment depending on a resource that has been chosen for use within another product segment. Considering the equipment resources, it is often necessary to model the constraint that two or more product segments must use the same equipment. Another frequent case describes the need to model the requirement for a product segment to use an equipment which is physically connected to an equipment in use in another product segment.

So far, this type of constraints is modeled individually using custom attributes of the respective product segments. According to this procedures, an engineer has to identify the involved product segments and to chose an adequate custom attribute to represent this constraint. Later on, a manufacturing execution system does not use these constraints; again, the engineer must implement a custom procedure to check the dependencies influencing the normal process execution in order to assure that the production is performed correctly.

Unfortunately, this procedure causes the process to have an internal interface for the hand-over of the data stemming from the identification step into the implementation step. Beside a certain risk for failures, either by data transfer or data interpretation errors, this procedure does not render the system into a fully automated system, but the engineers have to handle this step individually by hand (of course, they use computers, but the intelligent work has to be done by both of them personally).

SUMMARY OF THE INVENTION

It is therefore the aim of the present invention to provide a system and a method for handling a dependency between two product segments of a process modeling a production system within a manufacturing execution system. The system and method shall provide persistent data flow on the identification and implementation of the above-mentioned constraints and dependencies resp.

Accordingly, one aspect involves a system for handling a dependency between two product segments of a process modeling a production system within a manufacturing execution system. The system includes a network and a production modeler. The network has data processing units running a MES software for controlling and/or monitoring a production process operating a production components. The production modeler within the MES software defines the dependency between the two product segments, and allows modeling the dependency in a graphical environment as a link between the two product segments. The link is selected from a tool box having link types, each defining one of predetermined dependencies, such as: the two product segments run in parallel, one of the product segments starts after end of the other product segment, one of the product segments starts with a predetermined delay after the other product segment has been started, both two product segments use an identical equipment, and one of the product segments uses an equipment which is physically connected to an equipment used by the respective other product segment.

These features now generate a new environment to handle both the step of identifying the dependencies and to program these dependencies by selecting the required link type between the product segments. The dependencies programmed accordingly can now directly be "re"-used from the manufacturing execution system when generating the code for executing the production process. It has to be pointed out that the term "equipment" in this context can be understood as a physically present equipment, such as a machine, a process, a resource, an instance of a specific type of the afore-mentioned physical equipment, an equipment instance and the like. Nevertheless, the term "equipment" also includes any type of virtual equipment necessary to execute the desired production process.

In order to facilitate an effective programming of the dependency, said product segments may be graphically represented by descriptive symbols which can be linked by user operation on a data input device comprised within at least one of the data processing units. A further preferred embodiment may be realized by establishing the link by interaction on a touch-sensitive screen comprised in at least one of the data processing units.

BRIEF DESCRIPTION OF THE SEVERAL VIEWS OF THE DRAWINGS

The novel features and method steps characteristic of the invention are set out in the claims below. The invention itself, however, as well as other features and advantages thereof, are best understood by reference to the detailed description, which follows, when read in conjunction with the accompanying drawings, wherein:

DETAILED DESCRIPTION OF THE INVENTION

Figure 1:
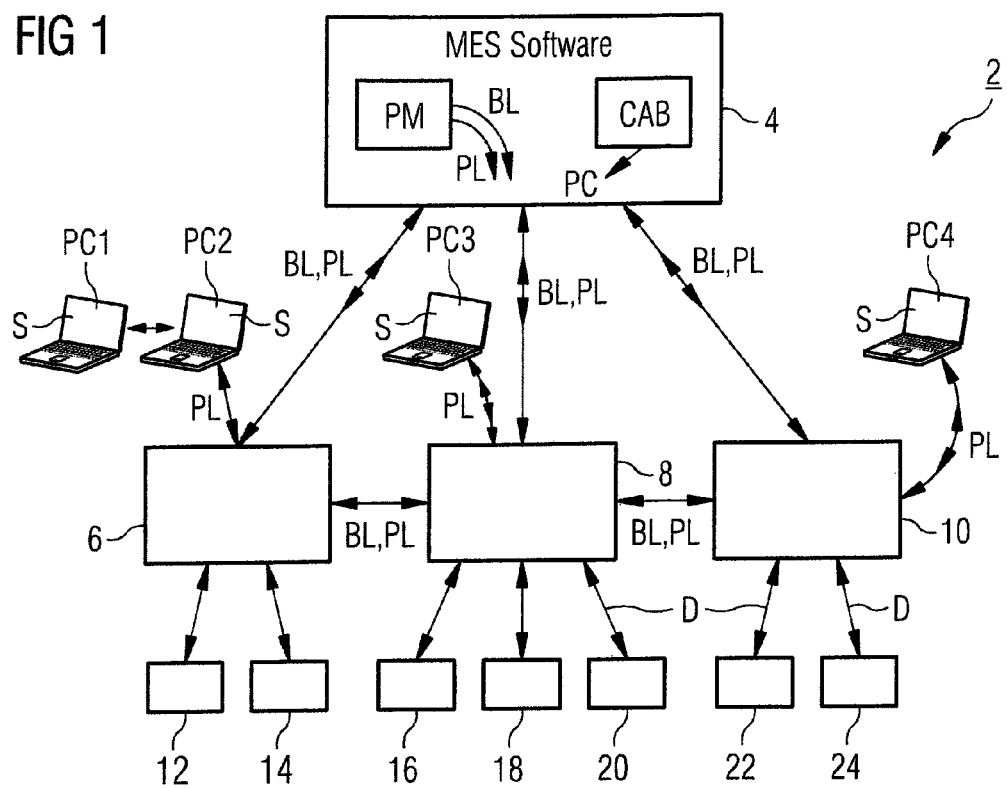
FIG. 1 shows a schematic overview of a system for handling a production process within a manufacturing execution system.

FIG. 1 illustrates a schematic overview of a plant control system 2 working as a manufacturing execution system (MES). The system/network 2 comprises a number of data processing units 4, 6, 8, 10 running a MES software for controlling and/or monitoring a production process operating a number of production components 12 to 24. The production components 12 bis 24 can be sensors, actuators, motors, step drives, conveyors, valves, pumps and the like. The data processing units 4 to 10 are network computer which typically comprise logical units, calculation means, storage means, display means and the like. The data processing units 4 to 10 are connected within a plant network in order to exchange data to the required extent. One of the data processing units, hereinafter referred to a master console 4, is executing the MES software for controlling and monitoring the operation of the plant.

The master console 4 comprises within the MES software a production modeler PM. This production modeler PM is enabled to define a business logic BL within a fully graphical environment as facilitated by the MES software. The business logic BL, when finally generated by the production modeler, comprises a plant model of the production process and the related operating procedures for the production components 12 to 24 in a fully graphical environment. Even for the creation of the business logic BL high-level graphical language is used within the MES software, preferably consistently with the ISA-95 standard.

The master console 4 further comprises a client application builder CAB within the MES software being enabled to provide a native, WEB based graphical user interface for generating cross-functionality graphic screens S, said screens forming part of the network 2 as presentation clients PC, PC1 to PC4 and displaying data D which is stemming from the production components 12 to 24 and which is manipulated from the business logic BL by the production modeler PM, where it is required, i.e. when the data stemming from one of the production components 12 to 24 has to further processed or averaged with data stemming from other production components.

Figure 2:
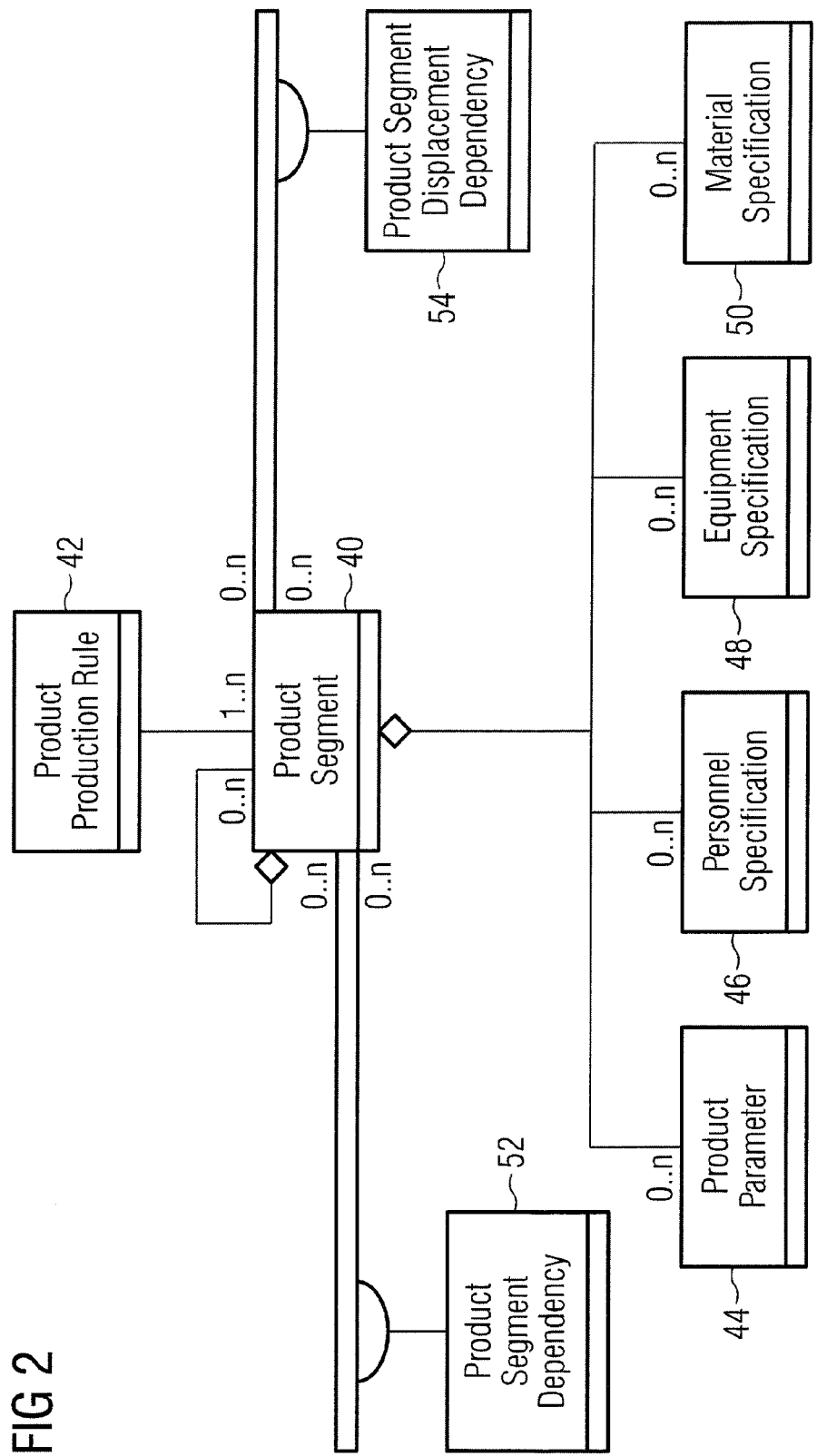
FIG. 2 shows a schematic overview over a standard model for product segments.

According to the present invention, this system 2 further comprises within the MES software, preferably within the production modeler PM, a routine for handling a dependency between two product segments of the process modeling the production system within a manufacturing execution system. The production modeler PM within the MES software is now enabled to define the dependency between at least two product segments within a product production rule. The standard model for this product segment is illustrated in FIG. 2. The production modeler PM is the tool for modeling the dependency(ies) in this graphical environment as a link between the two product segments. For these links a tool box exists comprising a predetermined variety of link types. Each link type is hereby defining a distinct dependency which can be selected from the group listed hereinafter:

i) A link type that effects the dependency of the two product segments that must run in parallel;

ii) A link type that effects that one of the product segments must start after end of the other product segment;

iii) A link type that effect the dependency that one of the product segments must start with a predetermined delay after the other product segment has been started;

iv) A link type effecting the dependency that both two product segments must use an identical equipment; and v) A link type effecting the dependency that one of the product segments must use an equipment which is physically connected to an equipment used by the respective other product segment.

Within the technical terms of the ISA-95 standard the execution dependencies are coded as follows (wherein PS stands for product segments):

Execution Dependencies (Also Called S95 Dependency)
NotFollow: The active PS cannot follow the previous PS.
PossibleParallel: The active PS can run at the same time as the previous PS.
NotInParallel: The active PS must either finish before or start after the previous PS.
AtStart: The active PS must begin when the previous PS starts.
AfterStart: The active PS must begin after the previous PS starts.
AfterEnd: The active PS must begin after the previous PS finishes.
NoLaterAfterStart: The active PS must begin no later than the time at which the previous PS begins.
NoEarlierAfterStart: The active PS must begin after the previous PS begins.
NoLaterAfterEnd: The active PS must begin before the previous PS finishes.
NoEarlierAfterEnd: The active PS must begin after the previous PS finishes.
Other: to use a custom PS dependency.
Displacement Dependencies
Same: both PSs must have the same execution equipment
Connected: in Production Modeler, the first PS's execution equipment must be connected to that of the second PS.

The group above-mentioned currently comprises five link type that could be either programmed in a sole position between two product segments but also further link types can be programmed in order to meet the present requirements.

FIG. 2 is illustrating a standard model for the product segment 40. This production segment 40 forms usually part of a product production rule 42. Each product production rule 42 may have associated a number of n product segments 40 wherein n is here at least equal or larger than "1". Each product segment 40 may comprise a product parameter 44, a personnel specification 46, an equipment specification 48 and a material specification 50. Further, each product segment 40 comprises an execution dependency on the product segment dependencies 52. The product segment dependencies 52 may contain all information on the sequence- and time-sensitive requirements of a product segment relative to other product segments 40. Further, each product segment 40 comprises a further dependency which is hereinafter referred to as a displacement dependency on a product segment displacement dependency 54. This product segment displacement dependency 54 now comprises all the information on the relationship to other product segments with respect to the equipment or equipment instance used.

Figure 3:
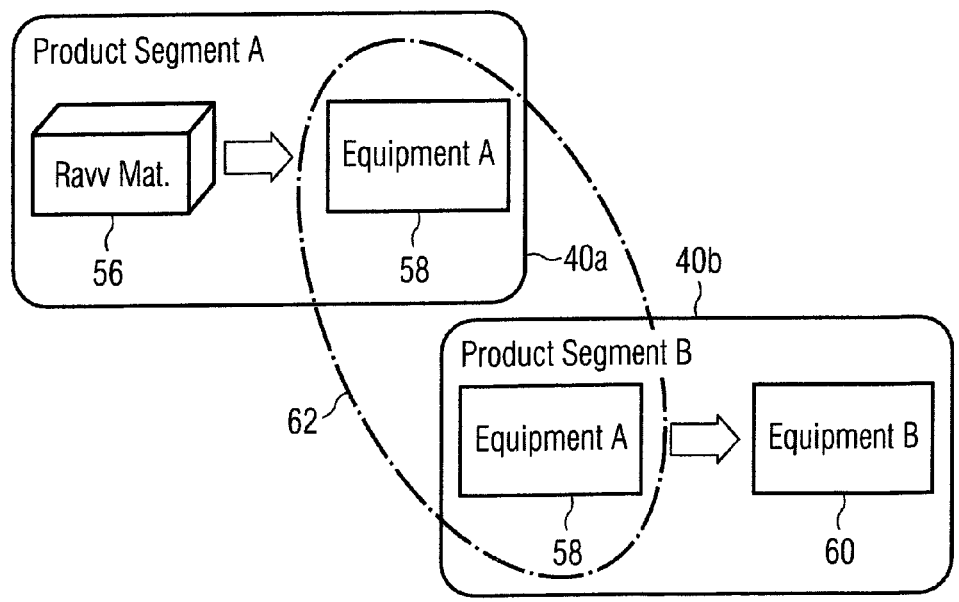
FIG. 3 shows a schematic example on the dependency between two product segments.

A simple example for this kind of dependency is given in FIG. 3. On a screen of a graphical user interface interacting with the MES software, two product segments 40a and 40b are illustrated. The product segment 40a thereby requires some raw material 56 that has to be processed on a first equipment 58. The product segment 40b thereby requires the first equipment 58, too, and a second equipment 60 subsequently. The physical constraint here easily to observe is that both product segments 40a and 40b use the first equipment 58 within their execution table. A link 62 between these to product segments 40a and 40b with respect to this constraint is represented by a chain-dotted ellipse surrounding both the first equipment 58 in the product segments 40a and 40b. In the MES software, this link 62 is now interpreted in a way that both product segments 40a, 40b uses the same first equipment 58. By a time-sensitive product segment dependency 52 one could exclude that product segments 40a and 40b are executed simultaneously in order to avoid that both product segments 40a and 40b come into a deadlock situation since they both want to use the first equipment 58. This time-sensitive product segment dependency 52 is not appropriate in any case since the first equipment 58 might have the capacity to satisfy both product segment 40a and 40b simultaneously. The link 62 is now the appropriate solution for this situation since the engineer setting the links 62 does not necessarily need to know anything about the properties of the first equipment 58. The only thing he is doing is to identify and mark both product segments 40a and 40b with respect to the product segment displacement dependency 54 that both product segments 40a and 40b need to use the first equipment 58 whatever that might mean on possible implications on the production scheduling level later on.

As illustrated in FIG. 3, the product segments 40a and 40b are graphically represented by descriptive symbols which can be linked by user operation on a data input device comprised within at least one of the data processing units. The link 62 is herein established by interaction on a touch-sensitive screen comprised in at least one of the data processing units. The link 62 can be established by drawing tools that are well known from the various existing designer software tools. For each product segment displacement dependency 54 a respective link or link symbol like the chain-dotted ellipse in FIG. 3 exist within a tool box that is—for instance—designed as a drop-down list with a combined drag & drop functionality within the graphical user interface.

What is claimed is:

1. A system for handling a dependency between two product segments within a process modeling of a production system within a manufacturing execution system (MES), comprising:

a network comprising a number of data processing units running an MES software designed according to the ANSI/ISA/95 standard for at least one of controlling or monitoring a production process operating a number of production components; and a production modeler within the MES software enabled to define the dependency between the two product segments;

said production modeler modeling the dependency in a graphical environment as a link between the two product segments, said two product segments being graphically represented by descriptive symbols which can be linked by user operation on a data input device included within at least one of the data processing units, and said link being established by interaction on a touch-sensitive screen included in at least one of the data processing units;

said link being selected from a tool box being represented by a graphical object on said touch-sensitive screen and being designed as a drop-down list with a combined drag-and-drop functionality within the graphical environment;

said tool box including a predetermined variety of link types;

each link type defining one of the following dependencies:
  i) the two product segments run in parallel;
  ii) one of the product segments starts after an end of the other product segment;
  iii) one of the product segments starts with a predetermined delay after the other product segment has been started;
  iv) both two product segments use an identical equipment; and
  v) one of the product segments uses an equipment which is physically connected to an equipment used by the respective other product segment.

2. A method for handling a dependency between two product segments within a production modeling of a production system within a manufacturing execution system (MES) executed by a data processing unit of a computer, comprising the steps of:

providing a network including a number of data processing units running an MES software designed according to the ANSI/ISA/95 standard for at least one of controlling or monitoring a production process according to the product segments, thereby operating a number of production components;

providing a production modeler within the MES software enabled to define the dependency between the two product segments, the production modeler modeling the dependency in a graphical environment as a link between the two product segments, the two product segments being graphically represented by descriptive symbols that can be linked by user operation on a data input device included within at least one of the data processing units;

establishing the link by interaction on a touch-sensitive screen included in at least one of the data processing units and selecting the link from a tool box represented by a graphical object on the touch-sensitive screen, the tool box being designed as a drop-down list with a combined drag-and-drop functionality within the graphical environment, the tool box including a predetermined variety of link types;

each link type defining one of the following dependencies:
  i) the two product segments must run in parallel;
  ii) one of the product segments must start after an end of the other product segment;

iii) one of the product segments must start with a predetermined delay after the other product segment has been started;
iv) both two product segments must use an identical equipment; and
v) one of the product segments must use an equipment which is physically connected to an equipment used by the respective other product segment.

\* \* \* \* \*